(12) United States Patent  
Kirsch

(10) Patent No.: US 7,341,613 B2
(45) Date of Patent: Mar. 11, 2008

(54) FILTER ELEMENTS HAVING INJECTION MOLDED THERMOPLASTIC SEALS AND METHODS OF MAKING SAME

(75) Inventor: Mark T. Kirsch, Mount Holly, NC (US)

(73) Assignee: Wix Filtration Corp LLC, Gastonia, NC (US)

(*) Notice: Subject to any disclaimer, the term of this patent is extended or adjusted under 35 U.S.C. 154(b) by 41 days.

(21) Appl. No.: 10/762,240

(22) Filed: Jan. 23, 2004

(65) Prior Publication Data

US 2004/0194441 A1 Oct. 7, 2004

Related U.S. Application Data

(63) Continuation-in-part of application No. 10/404,109, filed on Apr. 2, 2003.

(51) Int. Cl.
*B01D 46/00* (2006.01)

(52) U.S. Cl. .............................. 55/495; 55/497; 55/502; 264/252; 264/DIG. 48

(58) Field of Classification Search ................. 55/502, 55/509, 385.3, DIG. 28, DIG. 30, 490, 497, 55/499, 507, 498, DIG. 5, 495; 525/191–194, 525/216, 222; 264/DIG. 48, 252; 425/116, 425/812

See application file for complete search history.

(56) References Cited

U.S. PATENT DOCUMENTS

| 3,183,285 | A | * | 5/1965 | Boylan ....................... 264/46.4 |
| 3,397,518 | A | | 8/1968 | Rogers |
| 5,720,790 | A | * | 2/1998 | Kometani et al. ............. 55/497 |
| 5,755,844 | A | * | 5/1998 | Arai et al. ..................... 55/502 |
| 5,902,361 | A | | 5/1999 | Pomplun et al. |
| 5,958,097 | A | * | 9/1999 | Schlor et al. .................. 55/497 |
| 6,288,171 | B2 | | 9/2001 | Finerman et al. |
| 6,406,509 | B1 | | 6/2002 | Duffy |
| 6,454,826 | B2 | * | 9/2002 | Fath et al. ..................... 55/490 |
| 6,508,851 | B2 | * | 1/2003 | Goerg ........................ 55/385.3 |
| 6,706,087 | B1 | * | 3/2004 | Gebler et al. ................. 55/492 |
| 6,797,028 | B2 | * | 9/2004 | Duffy ......................... 55/385.2 |
| 6,824,581 | B1 | * | 11/2004 | Tate et al. .................. 55/385.3 |
| 6,830,443 | B1 | * | 12/2004 | Coffey et al. ................ 425/116 |
| 6,864,195 | B2 | * | 3/2005 | Peng ........................... 442/41 |
| 6,890,990 | B2 | * | 5/2005 | Cai et al. ..................... 525/191 |

FOREIGN PATENT DOCUMENTS

| DE | 10111118 | 11/2001 |
| EP | 1129760 | 9/2001 |
| JP | 10263348 A2 | 10/1998 |

OTHER PUBLICATIONS

Office Action dated May 4, 2007 for U.S. Appl. No. 10/404,109.

* cited by examiner

*Primary Examiner*—Duane Smith
(74) *Attorney, Agent, or Firm*—Honigman Miller Schwartz & Cohn LLP

(57) ABSTRACT

Seals for filter elements having filter packs with seals around the periphery thereof adjacent to one of the faces are produced by injection molding the seal onto the filter pack using an ethylene-propyleneterpolymer (EPDM) thermoplastic material. Preferably, the thermoplastic material is embedded in polypropylene particles. The resulting seal has a contact portion which bends and/or compresses upon being engaged by a lid of a filter housing as the lid closes.

34 Claims, 10 Drawing Sheets

FILTER ELEMENTS HAVING INJECTION MOLDED THERMOPLASTIC SEALS AND METHODS OF MAKING SAME

RELATED PATENT APPLICATIONS

This application is a continuation-in-part of U.S. patent application Ser. No. 10/404,109 filed Apr. 2, 2003, incorporated herein in its entirety.

FIELD OF THE INVENTION

The present invention is directed to filter elements having injection molded thermoplastic seals and methods of making such filters. More particularly, the present invention is directed to filter elements having generally planar filter media packs which are usually polygonal, wherein thermoplastic elastomer seals are molded thereon.

BACKGROUND OF THE INVENTION

Filter elements include seals for isolating the clean and dirty sides of the filter element from one another so that a fluid such as a gas or liquid does not bypass filter media comprising the filter element. The current practice is to use a casting process to fix foamed urethane seals to the filter media. Generally, this is done by injecting a two part liquid such as a polyol and isocyanate mixture into a mold having filter packs encased therein. Under heat the liquid mixture foams to create urethane seals on the filter media packs. The foamed urethane seals are designed to withstand sustained temperatures of about 200° F. and will tolerate up to about 275° F. for brief periods. Sustained temperatures at the 275° F. level can cause the seals to become thermoplastic and degrade by reshaping themselves. This is because the cells of the foamed urethane tend to collapse resulting in the seal becoming a less compressible solid and thus loosing its flexibility. This collapse can reduce the volume of the urethane by 200-300% and thus reduce the effectiveness of initially foamed urethane as a seal. Moreover, urethane seals tend to bond with filter element housings made from NYLON® when subjected to higher temperatures, making it difficult to remove filter elements from NYLON® housings during periodic maintenance.

SUMMARY OF THE INVENTION

In view of the aforementioned considerations, the present invention is directed to a filter element comprising a pleated filter media having filter face portions and side portions joined thereto by corner portions, and comprising a seal of substantially solid thermoplastic material disposed at least on one of the corner portions; the seal having a portion which flexes under a bending moment protruding from the adjacent filter face portion, and the seal having been formed on the corner portion by injection molding.

In a further aspect of the invention, the thermoplastic plastic material is a thermoplastic vulcanizate (TPV) such as ethylene-propyleneterpolymer (EPDM) embedded in polypropylene.

In another aspect of the invention, the filter element is a panel air filter element comprising a pleated filter media having a dirty-side face portion and a clean-side face portion joined to one another by end surfaces and side surfaces at corner portions. A substantial solid thermoplastic seal is disposed at one of the corner portions and extends obliquely from the plane of the face portion on which the corner portion is formed, as well as protruding laterally with respect to the end surfaces and side faces. The thermoplastic seal is formed at the corner by injection molding the thermoplastic material on and between the pleats of the pleated filter media at corner portions of the filter media.

In accordance with a method of making filter elements according to the present invention, the method is directed to inserting a filter media into an injection molding machine, and thereafter injecting a thermoplastic seal around the periphery of a face of the pleated filter media while the filter media is in the injection molding machine to form the filter element. The filter element is then ejected from the injection molding machine. Additional individual filter media are then sequentially inserted to the injection molding machine after previously formed filter elements have been ejected so as to provide a continuous production of individual filter elements.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
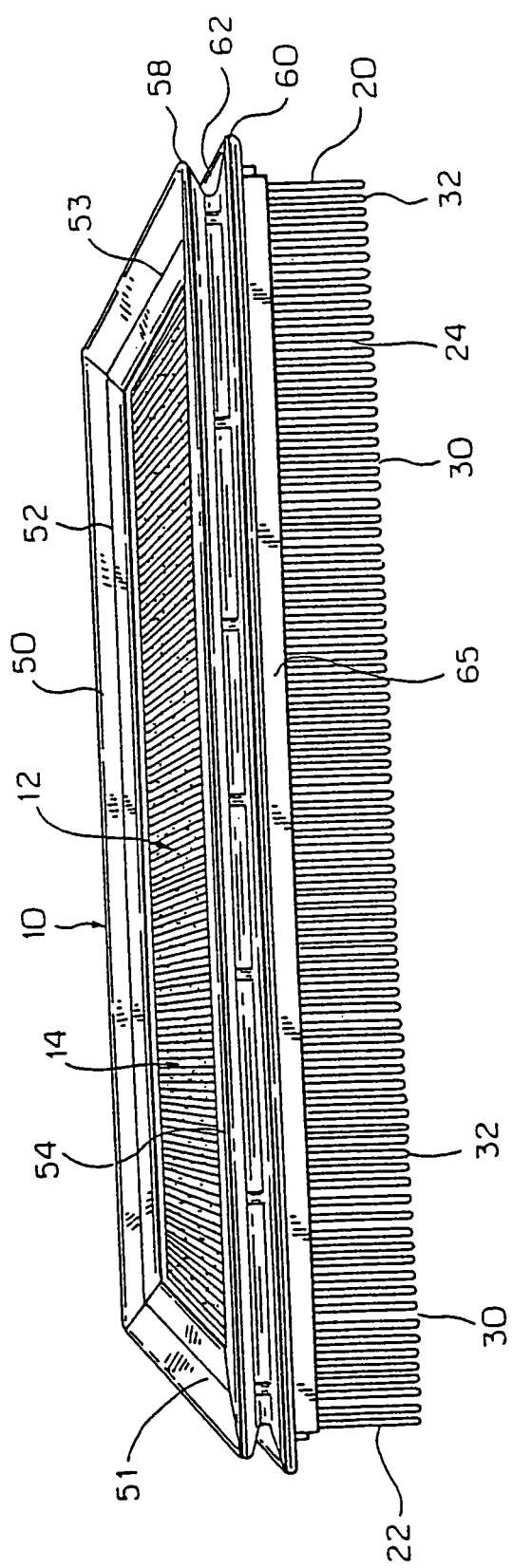
FIG. 1 is a side perspective view of a filter element configured in accordance with the principles of the present invention.
Figure 2:
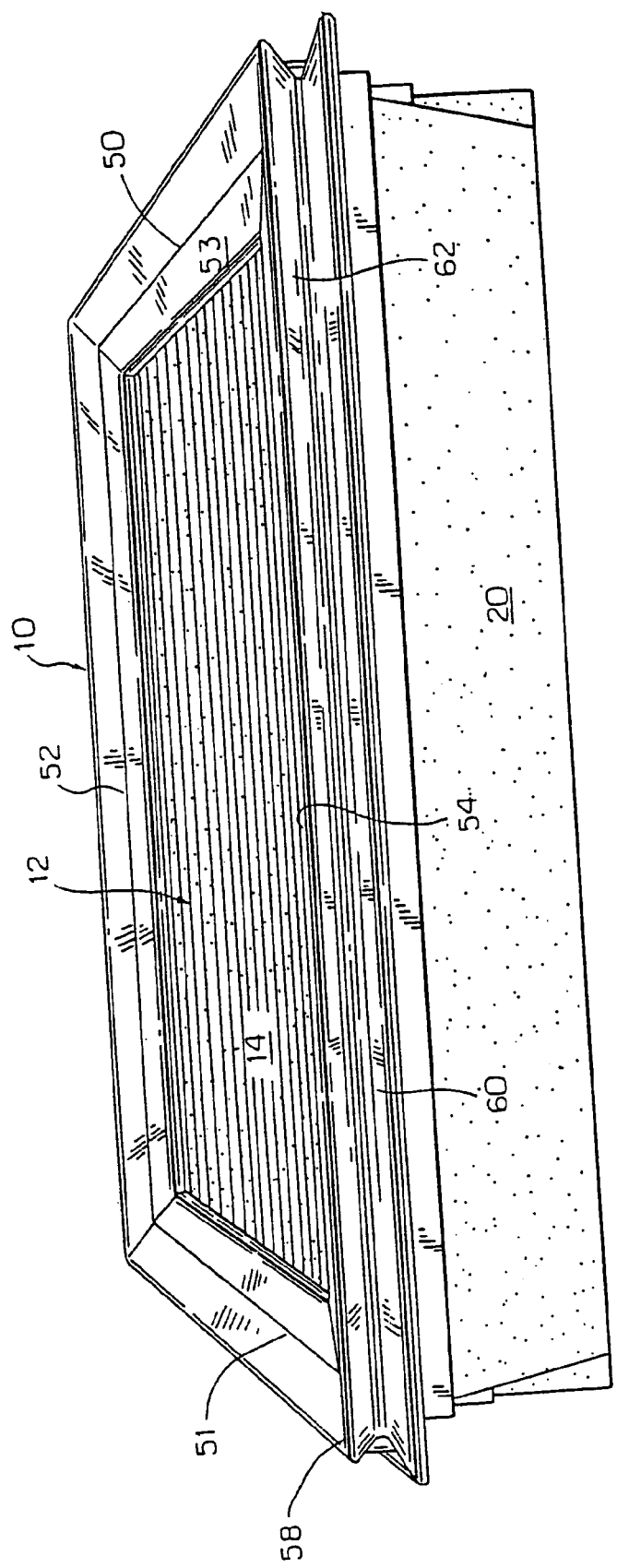
FIG. 2 is an end perspective view of the filter element of FIG. 1.
Figure 3:
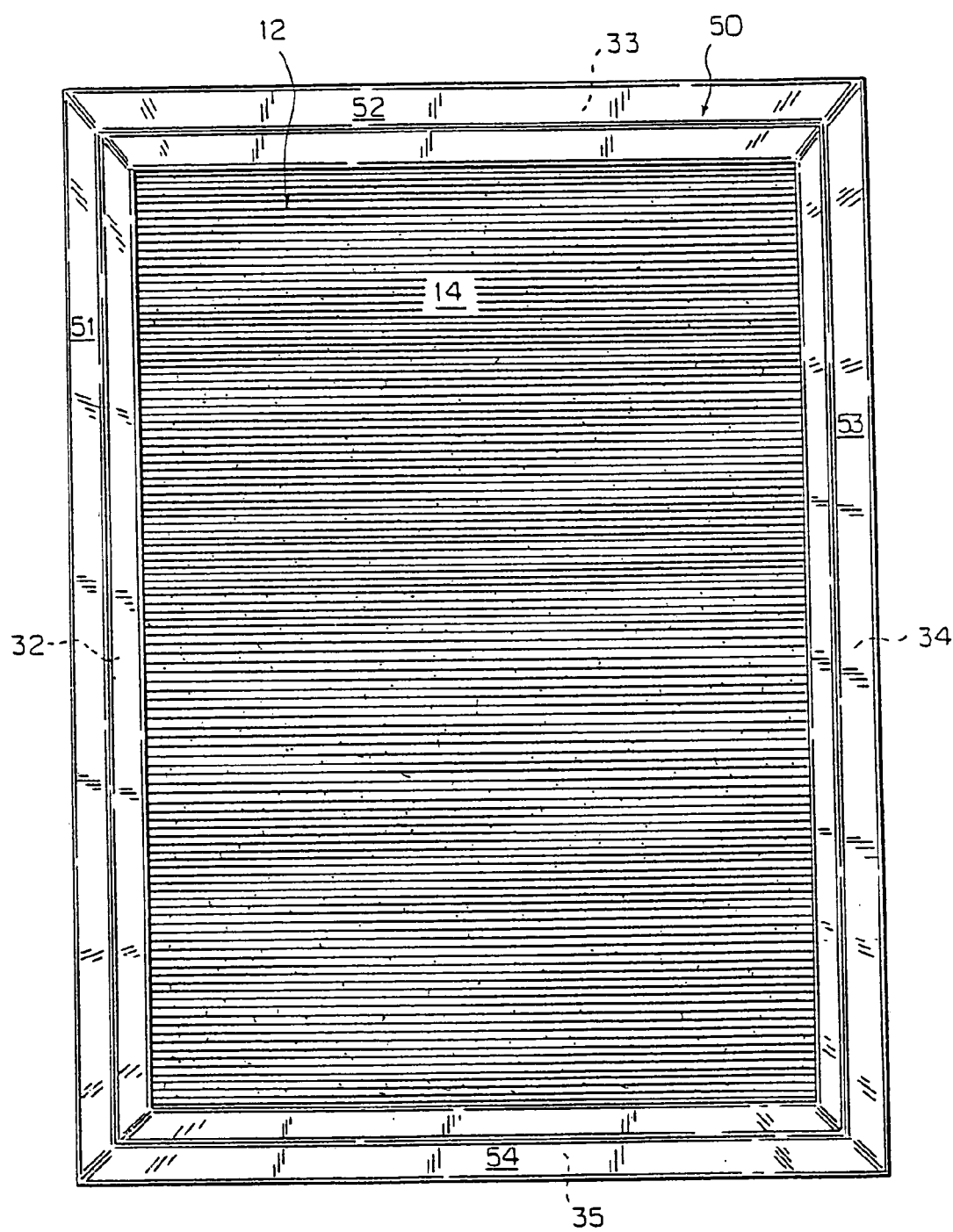
FIG. 3 is a clean-side face view of the filter element of FIGS. 1 and 2.
Figure 4:
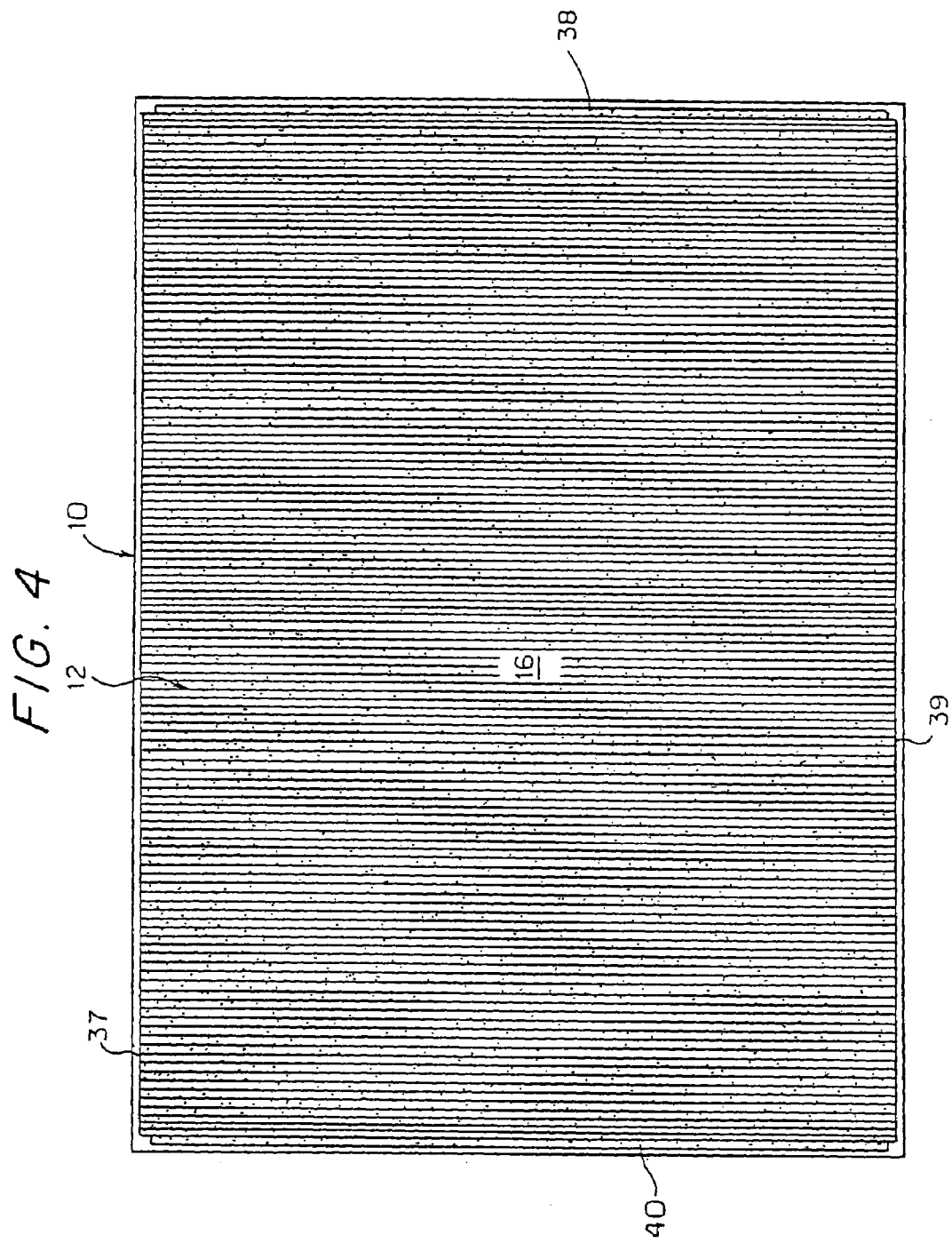
FIG. 4 is a dirty-side face view of the filter element of FIGS. 1-3.

Referring now to FIGS. 1-4, there is shown a filter element 10 configured in accordance with the principles of the present invention wherein the filter element has a pleated paper filter media 12 with a clean side face 14 (FIG. 3) and a dirty side face 16 (FIG. 4). The filter media 12 also includes first and second end surfaces 20 and 22 (FIG. 1) and first and second side surfaces 24 and 26 (FIG. 2). The end surfaces 20 and 22 are flat portions of a continuous web 28 of filter media comprising the filter media 12. The side surfaces 24 and 26 extend normal to gaps 30 between adjacent pleats 32 of the filter media.

The end surfaces 20 and 22 and the side surfaces 24 and 26 of the filter media 12 join the clean side face 14 at corner portions 32, 33, 34 and 35, while the dirty side face 16 joins the end surfaces and sides at corner portions 37, 38, 39 and 40.

It is necessary to isolate the clean side face 14 of the filter element 10 from the dirty side face 16 in order to cause all of the fluid passing through the filter element to be filtered by the filter media 12. This is accomplished by a peripheral seal 50 which is disposed through and on the clean side corner portions 32-35.

In the illustrated first embodiment, seal 50 has four sections 52, 53, 54 and 55 which have the same cross sectional configuration. Each of the four sections 52-55 has flexible resilient flanges of solid rather than foamed material that extend both laterally and outwardly with respect to the plane defined by the clean side face 14 of the filter media 12.

Figure 5A:
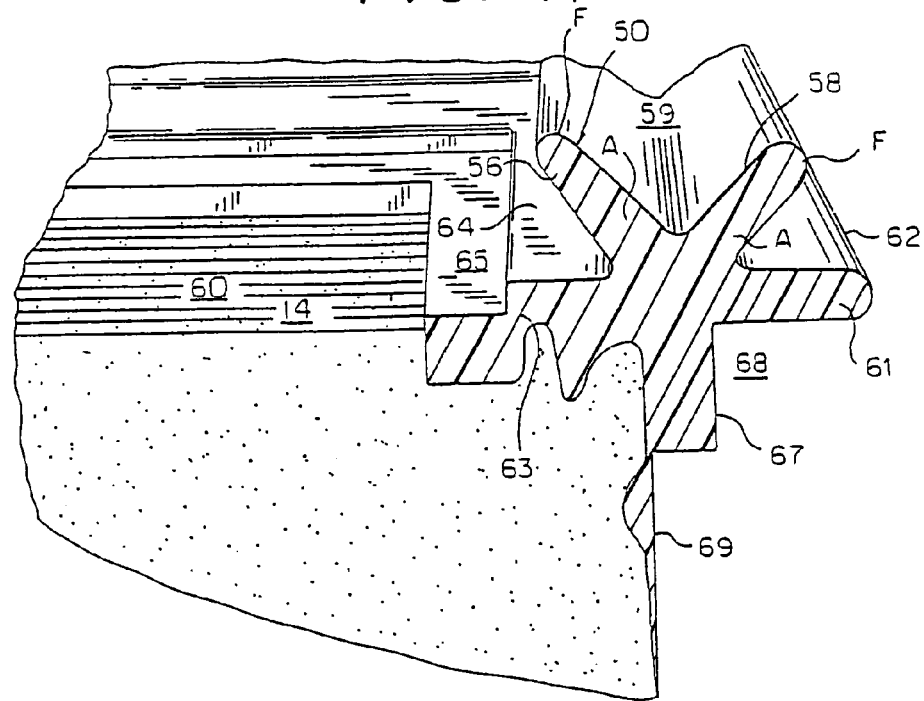
FIG. 5A is an end elevation of a portion of the filter element showing a first embodiment of a seal configured in accordance with the present invention.

As is seen in FIG. 5A, the seal 50 has a first flexible flange 56 is separated by from a second flexible flange 58 by a gap 59. The first flexible flange 56 extends obliquely and laterally inwardly with respect to a plane 60 defined by the clean side face 14, while the second flexible flange 58 extends obliquely and laterally outwardly with respect to the plane 60. When the flexible flange 56 and 58 are pressed against a surface of a housing the flanges bend away from one another widening the gap 59 with the flange 58 bending.

The second flexible flange 58 is separated by from a third flexible flange 61 by a gap 62 while the first flexible flange 56 is separated from a fourth flange 63 by a triangular gap 64. Injection molded material 65 from the fourth flange 63 extends across the clean face 14 of the filter media 14 and into the gaps 32 between the pleats 30. The third flange 61 is separated from a rim 67 of the seal 50 by a notch 68 with a portion 69 of the rim extending into the gaps 32 between the pleats 30.

The fourth flange 63, injection molded material 65, rim 67 and portion 69 of the rim form a base portion B of the seal 50 which is integral with filter media 12 after injection mold. The flexible resilient flanges 56 and 58 provide contact portions C of the seal which have anchor portions A which are unitary with the base portion B and free ends F which are engagable by the lid of the housing. As the lid closes, the flexible resilient flanges 56 and 58 bend with compression against the lid being provided by the bending moment in the flanges.

Figure 5B:
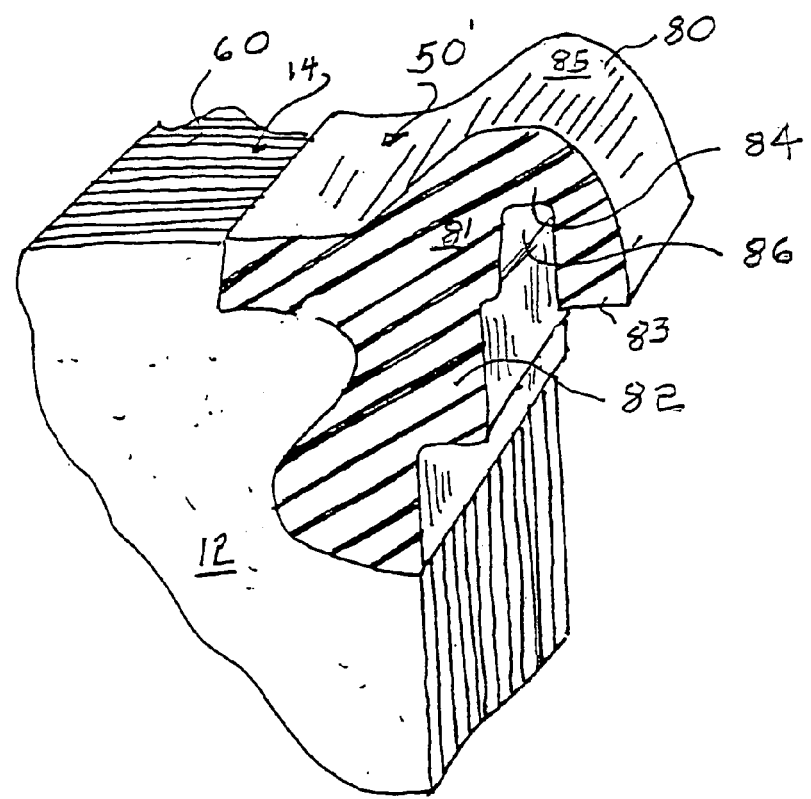
FIG. 5B is an end elevation of a second embodiment of a seal configured in accordance with the present invention.
Figure 5C:
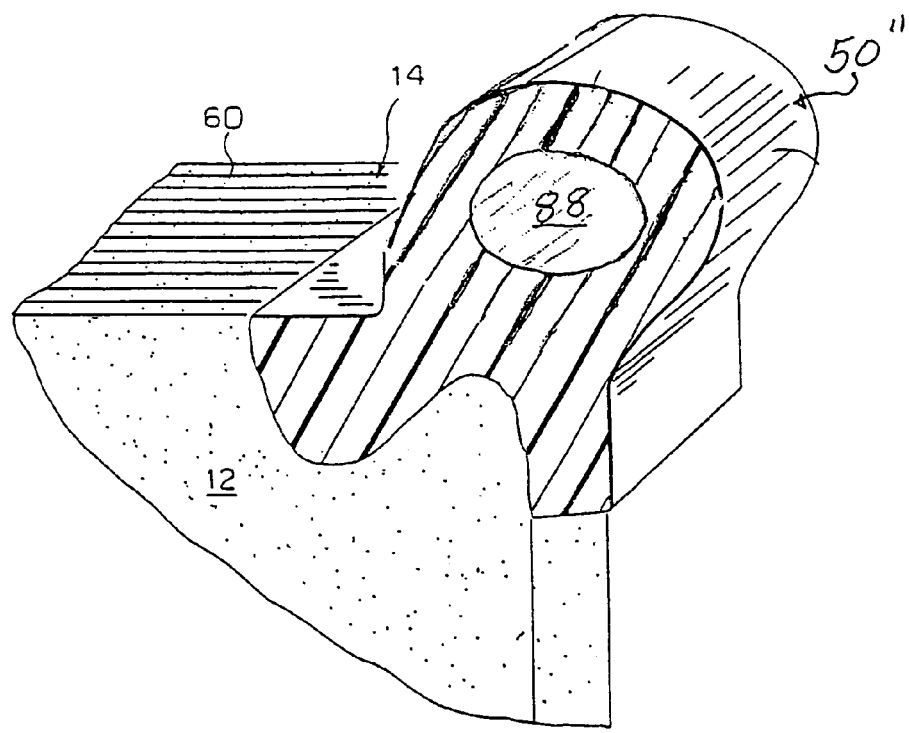
FIG. 5C is an end elevation of a third embodiment of a seal configured in accordance with the present invention.
Figure 5D:
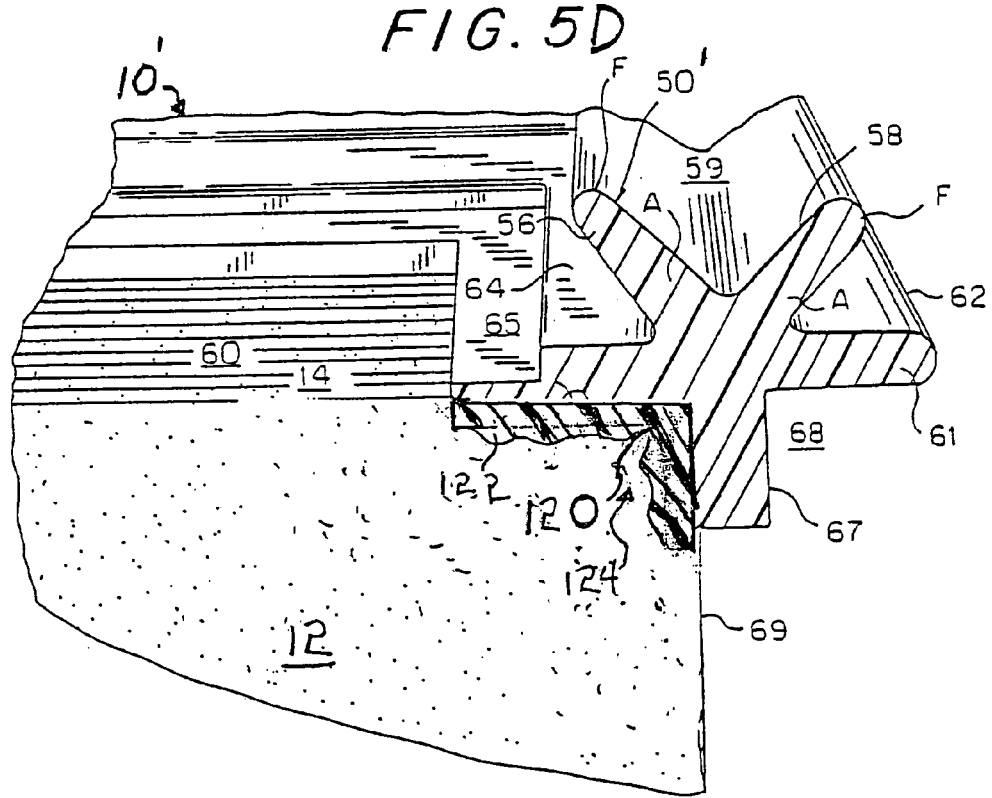
FIG. 5D is an end elevation of a fourth embodiment of the invention showing a seal molded onto a frame.
Figure 6:
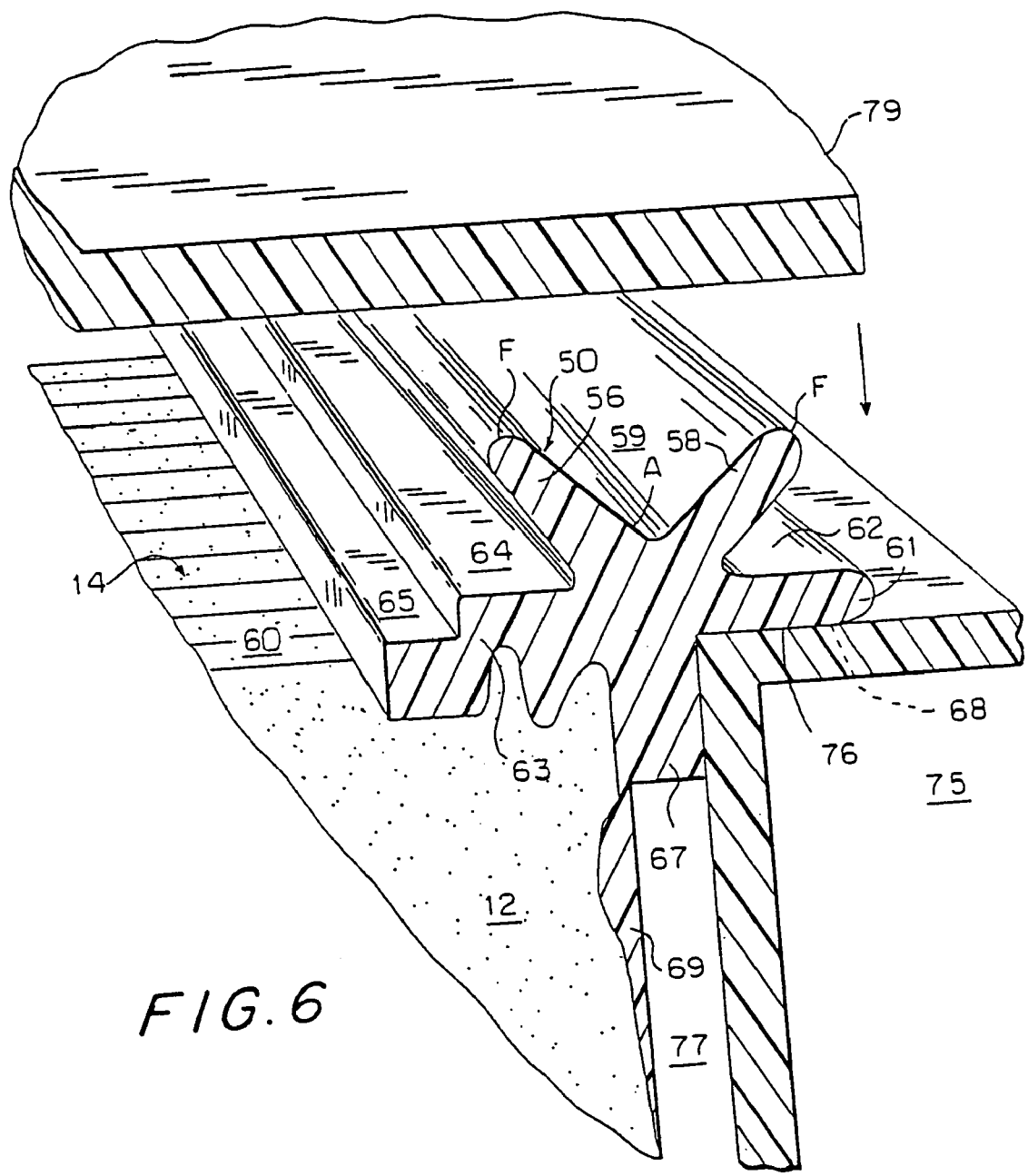
FIG. 6 is a view of the portion of the filter element of FIG. 5 showing that portion mounted in a housing with the lid of the housing open.

Referring now to FIG. 6 where the portion of the filter element of FIG. 5 is shown mounted in a housing 75, it is seen that a ledge 76 of the housing projects into the notch 68 of the seal 58 so that the third flange 61 of the filter element 50 rests on the ledge 76 of the housing 75 with the filter media 12 extending into the opening 77 through the housing.

Figure 7:
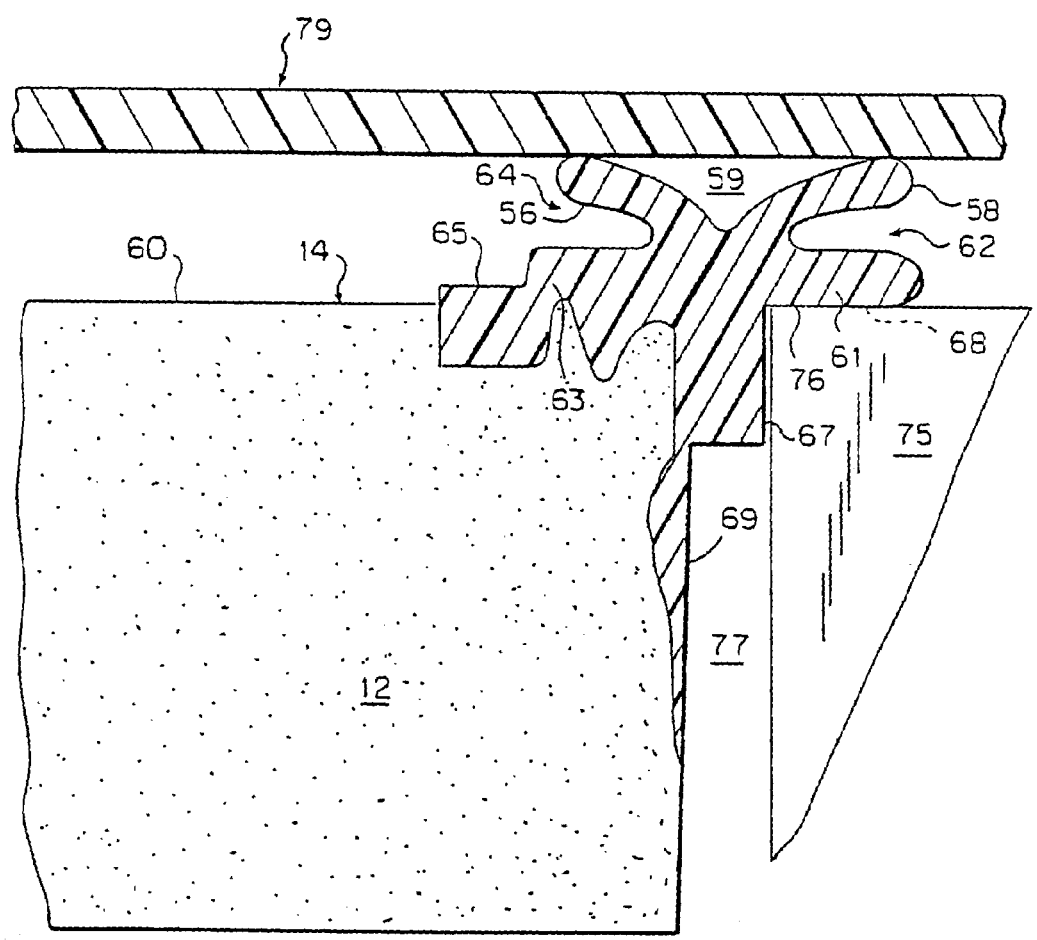
FIG. 7 is a view similar to FIG. 6 but showing the lid of the housing closed.

Referring now to FIG. 7, where the lid 79 of the housing closes, the first and second flexible flanges 56 and 58 bend toward the fourth flange 63 and the third flange 61, respectively, widening the triangular gap 59 and narrowing the triangular gaps 62 and 64. The pressure of the lid 79 against the first and second flanges 56 and 58 urges the third flange 61 against the ledge 76 of the housing, further sealing the clean side 14 of the filter element 10 from the dirty side 16.

The seal 50 is solid without the cells of prior art seals, so that the first and second flanges 56 and 58 provide contact portions of the seal which bend and assert compression against the lid 79 due to bending moments because force from the lid is applied to the free ends F of the first and second flanges. While two flanges are shown, a seal could also be accomplished with a single flange or with another configuration of contact portions the seal which rely on bending rather than compression of the seal material itself. Examples of other configurations for contact portions are circular, oval or polygonal contact portions.

FIG. 5B shows a U-shaped contact portion 80 having a first leg 81 extending from and unitary with a base portion 82 of a seal 50' and a second leg 83 connected by a bight 84 to the first leg 81. The first and second legs 81 and 83 of the U-shaped contact portion 80 define an open gap 86 therebetween. Upon engaging an outer surface 85 of contact portion 80 with the lid 79 of the housing 75 (see FIG. 7), the bight 84 bends because the second leg 83 deflects toward the first leg 81 into the gap 86 therebetween.

FIG. 5C shows a third embodiment of a seal 50", configured in accordance with the present invention, wherein the seal 50" is hollow, preferably without a vent opening therein. The hollow seal 50" has a continuous void 88, which is preferably circular or oval or polygonal in cross section, and which deforms in a radial direction when compressed by the lid 79 of the housing 75.

In accordance with the present invention, the seal 50 is preferably comprised of a thermoplastic elastic material (TPE) such as thermoplastic particles embedded in ethylene-polyethylene terpolymer rubber (EPDM). While this type of material is preferred, other elastic and resilient thermoplastic materials which are capable of being injection molded on and into the corners, 32, 33, 34 and 35 at the periphery of the filter media pack 12 may be used.

Figure 8:
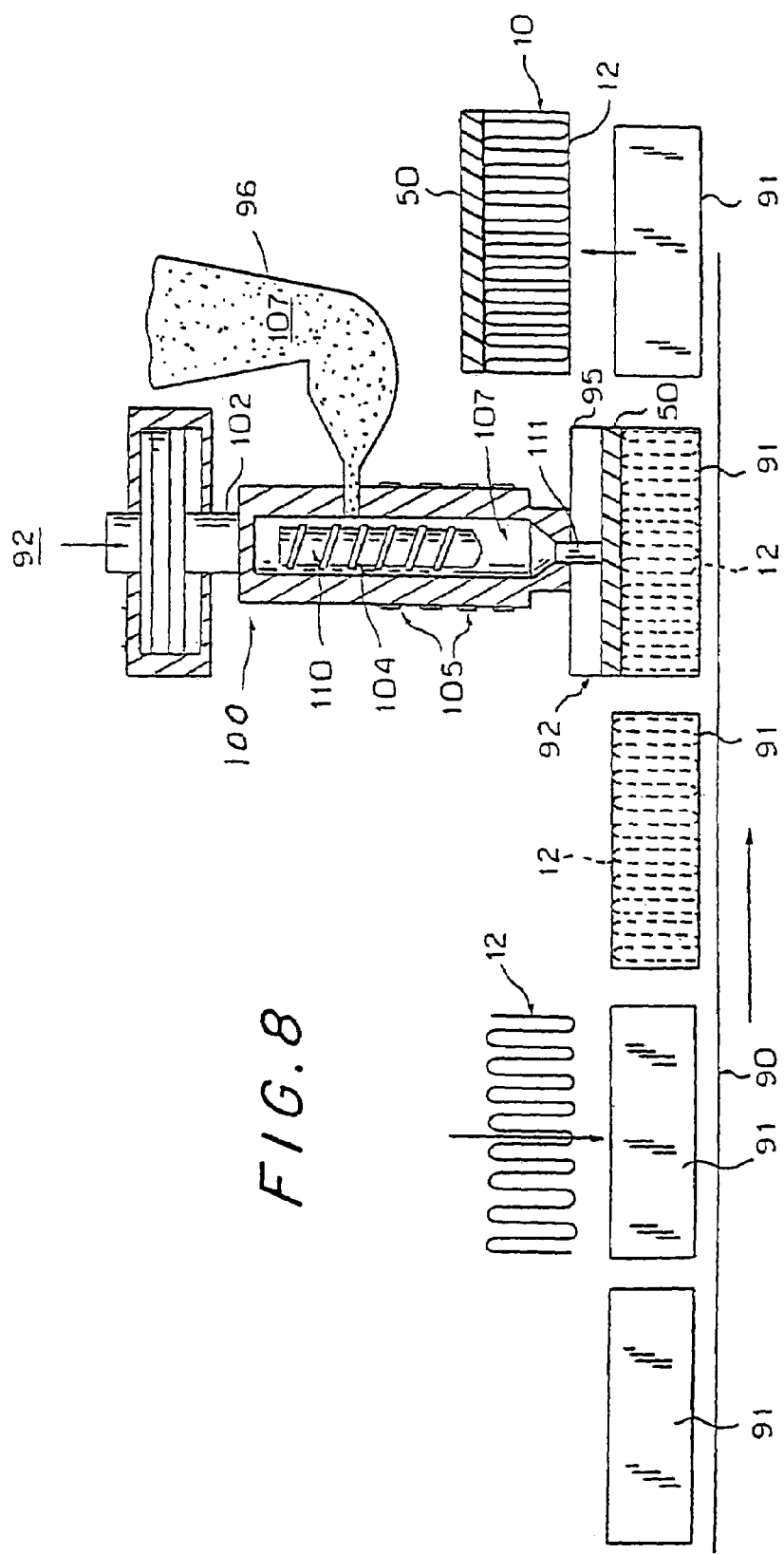
FIG. 8 is a schematic side view showing a method of making filter elements in accordance with the principles of the present invention.

Referring now to FIG. 8, there is shown apparatus for making the filter element 10 shown in FIGS. 1-4 according to a method of the present invention, wherein a production run for numerous filter elements 10 is illustrated. Apparatus for practicing the method of the invention includes a conveyer 90 on which is mounted the bottom section 91 of a two-section mold 92. The pleated filter media 12 is inserted into the bottom mold section 91 prior to, or in conjunction with, mounting a seal mold section 95 on the bottom mold section 91. In another arrangement, the seal mold section 95 may be integral with injection molding machine 100 (as shown) and the bottom mold section 91 may simply be advanced into alignment with the seal mold section 95 with the mold 92 being shut at an injection molding station 102.

In the injection molding machine 100, a barrel 104 is heated by heaters 105 while solid thermoplastic pellets are fed into the barrel 104 from a hopper 106. The thermosetting material 107 of the pellets is carried by a screw 110 within the barrel 104 down to a nozzle portion 111 of the barrel for injection into the seal mold section 95, which shapes the seal 50 as a ram 102 injects the molten material 107 into the seal mold section 95. It takes approximately thirty seconds for the seal 50 to cool and solidify. The mold 92 is then opened by separating the seal mold section 95 from the bottom mold section 91 and the finished filter element 10, comprised of the filter media 12 and seal 50, is ejected from the bottom mold section 91.

A subsequent bottom mold 91 carrying another filter media pack 12 is then aligned and closed by the second section 95. Approximately thirty seconds later, a second complete filter element 10 comprised of a filter media 12 and seal 50 is ejected.

Referring now to FIG. 5D there is disclosed a fourth embodiment of the invention wherein a rigid frame 120 is molded onto the filter media pack 12 prior to molding the seal 50' to create the filter element 10'. The rigid frame 120 has portions which flowed between the pleats of the pleated filter media 12 and adhered to the panels thereof adjacent the top corner 124 of the filter media. The rigid frame 120 is relatively hard and is made of a thermoplastic material such as polypropylene, polyurethane or polyethylene. When the seal 50' is ejected over the frame 120, the seal adheres to the frame. This results in a relatively stiff filter element 10'.

Figure 9:
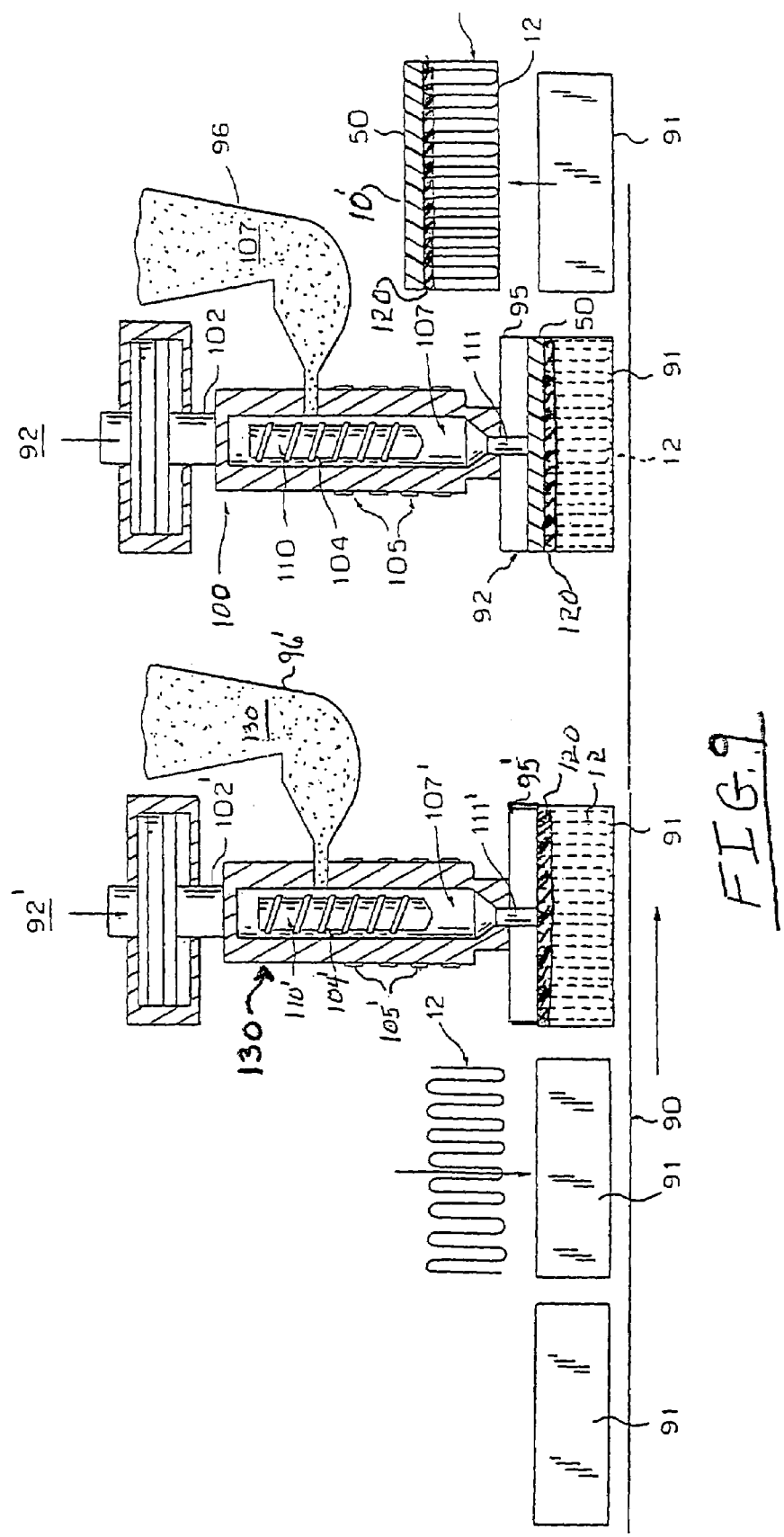
FIG. 9 is a schematic side view showing the method of FIG. 8 including molding a frame around a filter media pack prior to molding a seal thereon.

Referring now to FIG. 9 there is shown a method of making the filter element 10' of FIG. 5D, wherein an injection molding machine 130, configured like the previously described injection molding machine 100, injects molten material 132, such as polypropylene, polyurethane or polyethylene onto the filter pack 12 to form the frame 120. The mold section 95' distributes the molten material 132 along and around the upper edge 124 of the filter pack 12. After solidifying, the frame 120, receives the sealing material 107 thereon which is injected by the injection molding machine 100. The resulting filter element 10', rigidified by the frame 120, is then ejected from the bottom mold section 91.

The filter element is configured to accommodate the shape of the filter element housing, which, housing may be configured to save space and to nest within a convenient location with respect to an engine.

While a rectangular panel filter element is disclosed as produced and configured in accordance with the principles of the present invention, the filter element may have other than a rectangular or square shape. For example, the filter element many be circular, triangular, or be polygonal with more than four sides, such as generally rectangular filter element with having an additional short side or corner side for filter element orientation.

The filter element may also be annular with the seals being disposed at one or both end faces by utilizing thermal setting materials which have been injection molded onto the annular filter media. While pleated cellulose or cellulose blend filter media is disclosed in the embodiment of this application, other types of filter media which have woven or non-woven polymer strand filter media (such as polyester or polypropylene strands) or foam-type filter media may utilize injection molded thermoplastic seals as set forth in this invention.

From the foregoing description, one skilled in the art can easily ascertain the essential characteristics of this invention, and without departing from the spirit and scope thereof, can make various changes and modifications of the invention to adapt it to various usages and conditions.

I claim:

1. A filter element to be disposed in a filter housing, wherein the filter housing includes an inner surface, a ledge, and a lid, comprising;
   a filter media including a clean side face;
   a seal bonded to the clean side face, wherein the seal is bonded to a perimeter of the clean side face to form a flange portion integral with the filter media; and
   a flexible portion extending from the flange portion that is adapted to be compressed by the lid of the filter housing, wherein the flexible portion includes a pair of flexible flange portions that extend obliquely in divergent directions from the flange portion.

2. The filter element according to claim 1, further comprising a rim portion, wherein the rim portion is bonded to a perimeter of the filter media, wherein the perimeter of the filter media includes at least one side surface of the filter media.

3. The filter element according to claim 2, wherein the seal includes a second flange portion integrally-extending from the flange portion in a perpendicular direction with respect to the least one side surface of the filter media, wherein the second flange portion is adapted to overlay and seal said ledge of said filter housing.

4. The filter element according to claim 1, wherein the rim portion is adapted to radially engage and seal said inner surface of said filter housing.

5. The filter element according to claim 1, wherein the filter media is a pleated filter media including cellulose, cellulose blends, polyester fibers, or polypropylene fibers.

6. The filter element according to claim 1, wherein the seal includes thermoplastic elastomer (TPE) embedded in ethylene-polylene terpolynier rubber (EPDM).

7. A filter element comprising:
   a filter media including a clean side face;
   a rigid frame bonded to the clean side face, wherein the rigid frame is bonded to a perimeter of the clean side face to form a flange portion integral with the filter media; and
   a seal bonded to the rigid frame, wherein the seal is bonded to a perimeter of the rigid frame to form a seal flange portion integral with the rigid frame.

8. A method for manufacturing a filter element comprising the steps of:
   inserting a filter media into an injection molding machine, wherein the filter media includes a clean side face;
   injecting a material defining a rigid frame directly onto a perimeter of the clean side face; and
   injecting a material defining a seal including a flange portion directly onto the rigid frame.

9. The method according to claim 8, further comprising the step of forming, with the material defining the seal, a flexible portion extending from the flange portion.

10. The method according to claim 9, wherein the flexible portion includes a pair of flexible flange portions that extend obliquely in divergent directions from the flange portion.

11. The method according to claim 9, further comprising the step of forming a rim portion from the material defining the seal, wherein the rim portion is bonded to a perimeter of the rigid frame.

12. The method according to claim 9 further comprising the step of farming a second flange portion from the material defining the rigid frame that integrally-extends from the rigid frame in a perpendicular direction with respect to at least one side surface of the filter media, wherein the second flange portion is adapted to overlay and seal a ledge of the filter housing.

13. The method according to claim 9, wherein the flexible portion includes a U-shape portion having a first leg and a second leg.

14. The method according to claim 9, wherein the flexible portion includes a bulb seal including a void.

15. The method according to claim 8, wherein the thermoplastic material is a thermoplastic elastic material (TPE) embedded in ethylene-propylene terpolymer (EPDM).

16. The method according to claim 8, wherein the filter media is a pleated filter media comprised of cellulose, cellulose blends, polyester fibers, or polypropylene fibers.

17. A filter element to be disposed in a filter housing, wherein the filter housing includes an inner surface, a ledge, and a lid, comprising:
   a filter media including a clean side face;
   a seal bonded to a perimeter of the clean side face to form a flange portion integral with the filter media; and
   a flexible portion extending from the flange portion that is adapted to be compressed by the lid of the filter housing, wherein the flexible portion includes a U-shape portion having a first leg and a second leg, and wherein the U-shape portion extends toward the lid.

18. The filter element according to claim 17, further comprising a rim portion, wherein the rim portion is bonded to a perimeter of the filter media, wherein the perimeter of the fitter media includes at least one side surface of the filter media.

19. The filter element according to claim 18, wherein the seal includes a second flange portion integrally-extending from the flange portion in a perpendicular direction with respect to the least one side surface of the filter media, wherein the second flange portion is adapted to overlay and seal said ledge of said filter housing.

20. The filter element according to claim 17, wherein the rim portion is adapted to radially engage and seal said inner surface of said filter housing.

21. The filter element according to claim 17, wherein the filter media is a pleated filter media including cellulose, cellulose blends, polyester fibers, or polypropylene fibers.

22. The filter element according to claim 17, wherein the seal includes thermoplastic elastomer (TPE) embedded in ethylene-polylene terpolymer rubber (EPDM).

23. A filter element to be disposed in a filter housing, wherein the filter housing includes an inner surface, a ledge, and a lid, comprising:
 a filter media including a clean side face;
 a seal bonded to a perimeter of the clean side face to form a flange portion integral with the filter media;
 a flexible portion extending from the flange portion axially compressible by the lid of the filter housing, wherein the flexible portion includes a bulb seal defining a void.

24. The filter element according to claim 23, further comprising a rim portion, wherein the rim portion is bonded to a perimeter of the filter media, wherein the perimeter of the filter media includes at least one side surface of the filter media.

25. The filter element according to claim 24, wherein the seal includes a second flange portion integrally-extending from the flange portion in a perpendicular direction with respect to the least one side surface of the filter media, wherein the second flange portion is adapted to overlay and seal said ledge of said filter housing.

26. The filter element according to claim 23, wherein the rim portion is adapted to radially engage and seal said inner surface of said filter housing.

27. The filter element according to claim 23, wherein the filter media is a pleated filter media including cellulose, cellulose blends, polyester fibers, or polypropylene fibers.

28. The filter element according to claim 23, wherein the seal includes thermoplastic elastomer (TPE) embedded in ethylene-polylene terpolymer rubber (EPDM).

29. A filter element comprising:
 a pleated filter media including a generally planar first face defining a first planar axis and a generally planar second face, the filter media defining a media perimeter between the generallY planar first face and the generally planar second face, wherein to perimeter includes an end and a side that meet at a coma;
 a thermoplastic vulcanizate seal attached to the corner of the pleated filter media and extending over at least a portion of the end and at least a portion of the side, wherein the seal extends over at least a portion of the first planar face; and
 a first flange extending from the seal, wherein at least a portion of the first flange extends away from the filter media.

30. The filter element according to claim 29, further comprising a second flange extending from the seal, wherein at least a portion of the second flange extends away from the filter media, and further wherein the first flange and the second flange define a gap therebetween.

31. The filter element according to claim 30, wherein the first flange and the second flange are generally perpendicular.

32. The filter element according to claim 30, wherein an axis of the first flange and an axis of the second flange diverge.

33. The filter element according to claim 30, wherein the first and the second flange extend from a common base that extends away from the perimeter.

34. The filter element according to claim 29, wherein the first flange is connected to the seal via a base, and wherein the first flange extends from the base.

* * * * *

UNITED STATES PATENT AND TRADEMARK OFFICE
CERTIFICATE OF CORRECTION

PATENT NO. : 7,341,613 B2  
APPLICATION NO. : 10/762240  
DATED : March 11, 2008  
INVENTOR(S) : Mark T. Kirsch Page 1 of 1

It is certified that error appears in the above-identified patent and that said Letters Patent is hereby corrected as shown below:

Column 6:

In Claim 6, line 11, please change "terpolynier" to --terpolymer--.

In Claim 12, line 40, please change "farming" to --forming--.

Column 8:

In Claim 29, line 12, please change "generallY" to --generally--.

In Claim 29, line 13, please change "wherein to" to --wherein the--.

In Claim 29, line 14, please change "coma" to --corner--.

Signed and Sealed this

Fifteenth Day of July, 2008

JON W. DUDAS  
*Director of the United States Patent and Trademark Office*